R. J. LUTTRELL.
STANCHION.
APPLICATION FILED OCT. 28, 1915.

1,194,046.

Patented Aug. 8, 1916.
3 SHEETS—SHEET 1.

Inventor

R. J. Luttrell

By

Attorneys

R. J. LUTTRELL
STANCHION
APPLICATION FILED OCT. 28, 1915.

1,194,046.

Patented Aug. 8, 1916.
3 SHEETS—SHEET 3.

Inventor
R. J. Luttrell

By
Attorneys

UNITED STATES PATENT OFFICE.

RUFUS J. LUTTRELL, OF WHITLEY TOWNSHIP, MOULTRIE COUNTY, ILLINOIS.

STANCHION.

1,194,046. Specification of Letters Patent. Patented Aug. 8, 1916.

Application filed October 28, 1915. Serial No. 58,458.

*To all whom it may concern:*

Be it known that I, RUFUS J. LUTTRELL, a citizen of the United States, residing in Whitley township, in the county of Moultrie and State of Illinois, have invented certain new and useful Improvements in Stanchions, of which the following is a specification.

The invention has relation to means whereby the operation of applying a ring or like device to the snout of an animal is greatly facilitated and rendered less hazardous since the animal is so confined as to preclude any possible resistance or movement of the muzzle.

The invention has for its object the provision of a stanchion adapted to receive the animal and provided with means for confining the animal in a way to prevent injury thereto as also to preclude any movement which would tend to retard the operation of applying a ring or like means to the snout to prevent rooting or other action intended to be obviated by the application of the ring to the snout.

The invention, furthermore, has for its object the provision of a stanchion which may be manipulated by one person thereby reducing the cost of the ringing operation and enabling the same to be successfully and quickly performed without requiring a helper or other attendant.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Figure 1:
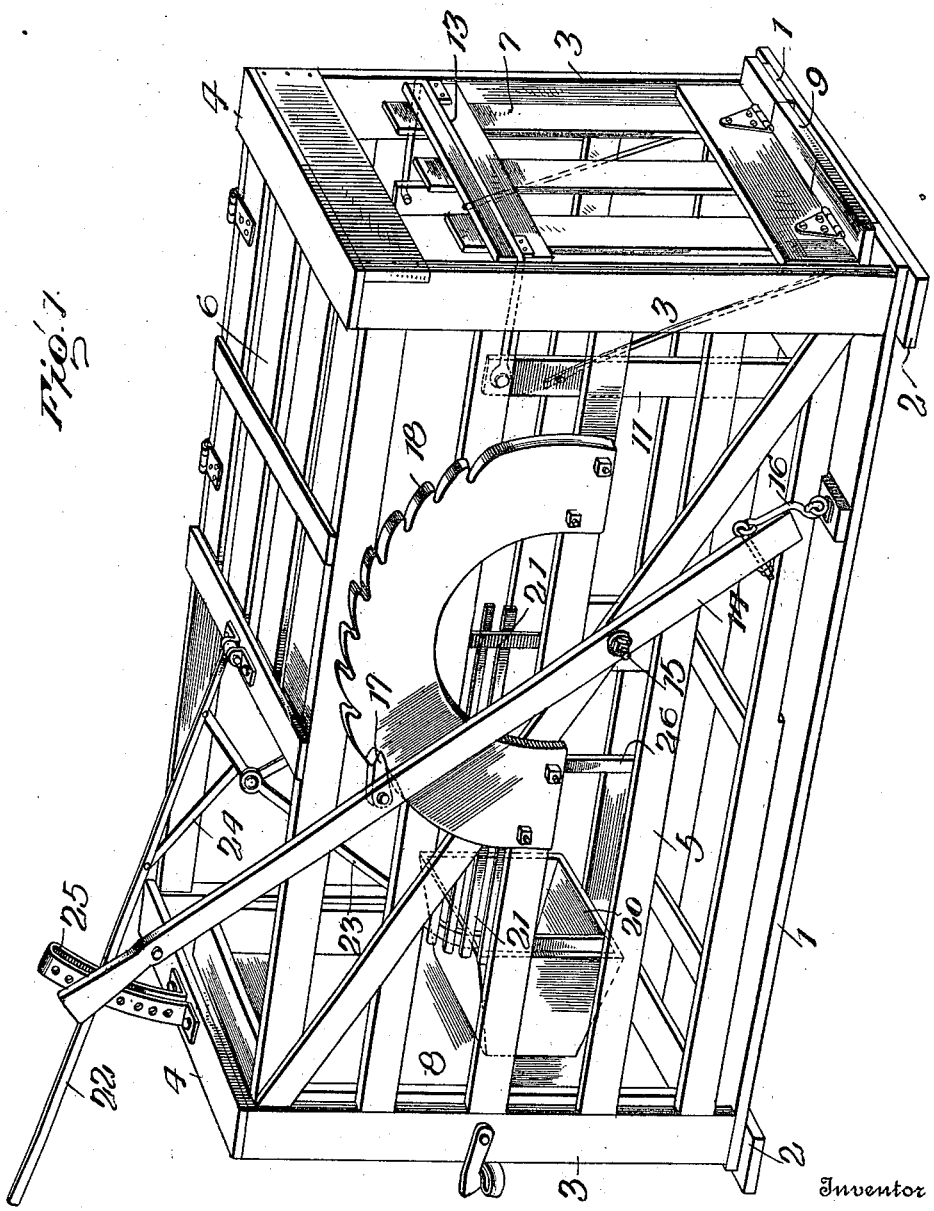
Figure 2:
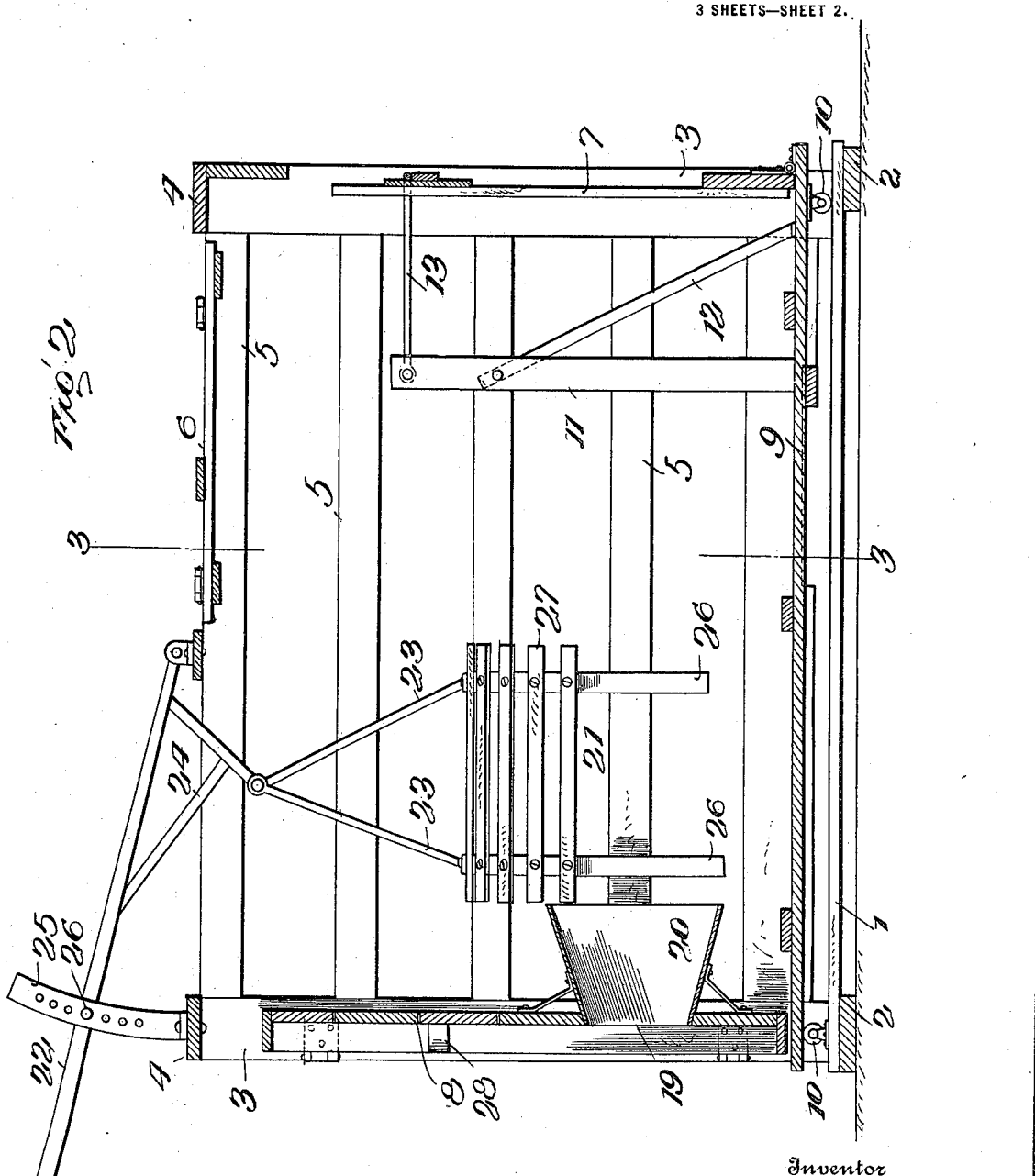
Figure 3:
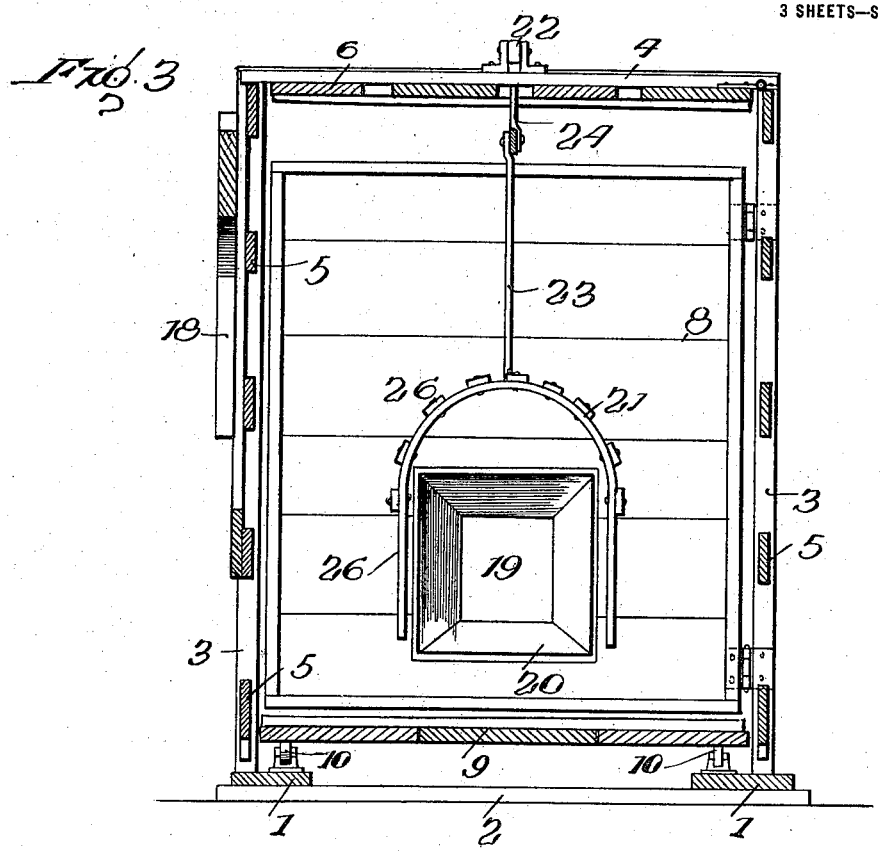
Figure 4:
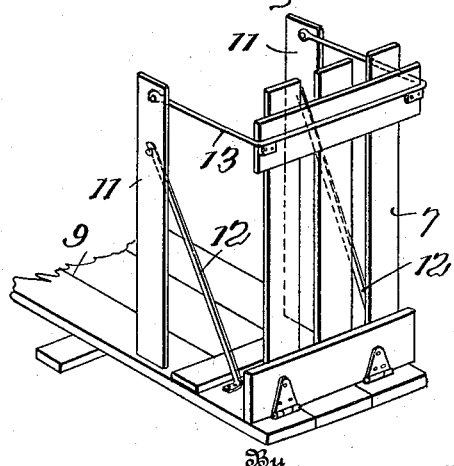

Referring to the drawings, Figure 1 is a perspective view of a stanchion embodying the invention; Fig. 2 is a vertical central longitudinal section of the stanchion; Fig. 3 is a transverse section on the line 3—3 of Fig. 2; Fig. 4 is a detail perspective view of an end portion of the bottom showing the door and uprights attached thereto.

Corresponding and like parts are referred to in the following description and indicated in all the views of the drawings by the same reference characters.

The stanchion as a whole is of such formation as to receive and inclose the animal to be operated upon. The dimensions of the stanchion are such as to receive the largest size animal. The walls comprising the stanchion are of open or slat formation to admit of ventilation, observation and a proper handling of the animal as also to provide a comparatively light structure and one which may be readily cleaned.

In its general formation the structure embodies longitudinal sills 1 and cross pieces 2, the latter connecting the sills and serving to support the super-structure. Uprights 3 project vertically from the base and are connected at their upper ends by suitable cross pieces 4. Longitudinal slats 5 are connected at their ends to the uprights 3 upon the same side of the framework and constitute side walls. A door 6 closes the top of the framework and is hinged at one edge to a side wall. Other doors 7 and 8 close the ends of the frame-work. The door 7 is hinged at its lower end to the bottom so as to swing outward and downward from its upper end. The door 8 is hinged at one edge to a side wall of the frame-work. The animal enters the stanchion through the door 7 and leaves by way of the door 8. The bottom 9 is mounted to slide longitudinally and carries the door 7. Rollers 10 are provided to relieve friction and enable the bottom 9 to move easily. Uprights 11 are secured at their lower ends to the bottom 9 a short distance from the door 7 and are strengthened and stayed by means of braces 12. A bail 13 pivotally connected to the upper ends of the uprights 11 is adapted to engage the upper end of the door 7 and hold the same in closed position. The bottom 9 is adapted to slide beneath the door 8 when the latter is closed.

Any suitable means may be provided for operating the bottom 9. As shown a lever 14 is fulcrumed at 15 to a side wall of the frame-work and is connected at its lower end to the bottom by means of a link 16. The bottom 9 is held against rearward movement by means of a pawl 17 and a ratchet bar 18. The pawl 17 is pivoted to the lever 14 and is reversible. When the bottom 9 is in normal position, as indicated in Fig. 1, it is prevented from being moved forward by means of the pawl 17 engaging a tooth of the bar 18. When the bottom 9 is moved forward the pawl 17 is reversed so as to engage any one of the remaining teeth of the ratchet bar 18, such teeth being disposed reversely to the forward tooth.

An opening 19 is formed in the forward door 8 to receive the end of the muzzle of the animal. A flaring guide 20 is secured to the door 8 and projects rearwardly therefrom in line with the opening 19. The guide 20 receives the snout of the animal and directs the same through the opening 19. The flared formation of the guide 20 serves a two-fold purpose, namely to direct the snout of the animal through the opening 19 as also to engage the muzzle and prevent opening of the mouth.

A compressing device is located within the structure near the forward end thereof and is in the form of a saddle to extend over the neck, back and sides of the animal to assist materially in confining and holding the animal in position during the process of applying a ring or like device to the snout. The compressing device is indicated at 21 and is moved vertically by means of a lever 22 which is pivoted at its rear end to a cross piece at the top of the frame-work. Links 23 connect front and rear portions of the compressing device with the lever 22 or a bracket 24 depending from such lever. Movement of the forward end of the lever 22 effects an upward or a downward movement of the compressing device 21, as may be required. The compressing device is held in the located position by suitable means, such as a bar 25 and pin 26, the latter passing through any one of a series of openings formed in the bar 25 and through an opening formed in the lever 22. The compressing device, as shown, comprises two arches 26 and a plurality of slats 27 secured to the upper portions of the arches.

In the operation of the invention the doors 6 and 8 are closed and fastened and the door 7 is swung open. The animal to be operated upon is driven into the stanchion over the door 7 after which such door is closed and fastened by means of the bail 13. The lever 14 is now manipulated to move the bottom 9 forward, thereby crowding the animal against the front door 8. At the same time the lever 22 is manipulated to bring the animal into a crouching position so that the snout will come in position to be engaged by means of the guide 20. A continued operation of the lever 14 advances the animal until the snout protrudes through the opening 19 and the muzzle is crowded into the guide 20. At this time the lever 22 is manipulated to lower the compressing device 21 so as to confine the animal and hold the same in position against movement. It will thus be understood that the animal is securely held, thereby enabling the ring or like device to be applied to the snout in the manner well understood, and with safety, both to the operator and animal and with despatch and without annoyance or inconvenience. After the ring or like device has been applied to the snout of the animal the lever 22 is released and at the same time the door 8 is unfastened and swung open, thereby liberating the animal which is free to pass from the stanchion after which the door 8 is closed and fastened and the bottom 9 returned to normal position preliminary to operating upon the next animal.

The numeral 28 designates a suitable box or receptacle attached to the front door 8 for convenience of receiving the rings, ringing device and other articles desired to have conveniently at hand.

Having thus described the invention, what is claimed as new is:—

1. A stanchion having an opening in its front wall for reception of the snout of an animal and having a longitudinally movable bottom, and a rear wall hingedly connected at its lower edge to the bottom whereby it is movable with the bottom and may be turned down to constitute an extension of the bottom to admit an animal to the stanchion.

2. A stanchion having a longitudinally movable bottom, a rear wall carried by said bottom and adapted to swing down beyond the same, standards on said bottom adjacent said rear wall, and a bail pivoted to the upper ends of said standards and adapted to engage with the upper ends of said rear wall to hold the same in a raised position.

In testimony whereof, I affix my signature.

RUFUS J. LUTTRELL. [L. S.]

Copies of this patent may be obtained for five cents each, by addressing the "Commissioner of Patents, Washington, D. C."